(12) United States Patent
Dvorak et al.

(10) Patent No.: US 7,849,688 B2
(45) Date of Patent: Dec. 14, 2010

(54) METHOD AND APPARATUS FOR RETARDING AN ENGINE

(75) Inventors: Paul A. Dvorak, Sanford, NC (US); Christopher M. Elliott, Apex, NC (US)

(73) Assignee: Caterpillar Inc, Peoria, IL (US)

( * ) Notice: Subject to any disclaimer, the term of this patent is extended or adjusted under 35 U.S.C. 154(b) by 518 days.

(21) Appl. No.: 11/961,008

(22) Filed: Dec. 20, 2007

(65) Prior Publication Data

US 2008/0207398 A1 Aug. 28, 2008

Related U.S. Application Data

(60) Provisional application No. 60/876,681, filed on Dec. 21, 2006.

(51) Int. Cl.
*F16D 31/02* (2006.01)
(52) U.S. Cl. .......................................... 60/456; 60/468
(58) Field of Classification Search ................... 60/456, 60/468, 489, 494
See application file for complete search history.

(56) References Cited

U.S. PATENT DOCUMENTS

| | | | |
|---|---|---|---|
| 5,507,360 A | 4/1996 | Simmons | |
| 6,609,368 B2 | 8/2003 | Dvorak et al. | |
| 6,718,763 B2 * | 4/2004 | Maruta et al. | 60/456 |
| 6,769,252 B2 * | 8/2004 | Smith | 60/456 |
| 6,845,614 B2 * | 1/2005 | Stahlman | 60/456 |
| 6,848,255 B2 | 2/2005 | Chiaramonte | |
| 2006/0069484 A1 | 3/2006 | Thomson et al. | |
| 2006/0069488 A1 | 3/2006 | Sychra et al. | |
| 2007/0099757 A1 | 5/2007 | Landes | |
| 2007/0284170 A1 | 12/2007 | Kuras et al. | |

* cited by examiner

*Primary Examiner*—Michael Leslie
(74) *Attorney, Agent, or Firm*—William A. Beckman

(57) ABSTRACT

A method and system for retarding an engine of a machine is provided. The machine has a hydraulic pump driven by the engine, a motor driven by the hydraulic pump, and a fan driven by the motor. The method includes sensing the operating speed of the engine with an engine speed sensor. The method also includes operating the motor at a first pressure. The method also includes comparing the operating speed to a trigger speed. The method also includes operating the motor at a second pressure greater than the first pressure if the operating speed of engine exceeds the trigger speed by a predetermined value.

20 Claims, 3 Drawing Sheets

METHOD AND APPARATUS FOR RETARDING AN ENGINE

CLAIM FOR PRIORITY

The present application claims priority from U.S. Provisional Application Ser. No. 60/876,681, filed Dec. 21, 2006, which is fully incorporated herein.

TECHNICAL FIELD

This disclosure relates generally to a method and apparatus for retarding an engine, and more particularly, to a method and apparatus for controlling a hydraulically driven fan to provide increased resistance to the engine during overspeed conditions.

BACKGROUND

Machines such as skid steer loaders, multi-terrain loaders, track-type tractors, tracked loaders, etc., generally have an engine powering some type of hydraulic system for propelling the machine or providing hydraulic power to linkages. These engines are typically cooled by a cooling system having a radiator and cooling fan. Some machine designs use a belt driven cooling fan with a fan speed fixed proportionally to the engine speed.

In some applications, it may be desired to provide retarding to assist in controlling the speed of the machine and engine when operating in downhill conditions. Machines having belt-driven cooling fans automatically provide an increase in torque resistance during such conditions. However, in an effort to increase machine efficiency, machines have been developed that replace the belt driven cooling fan with an electronically controlled hydraulically driven demand fan. These fans are operated only when required by engine cooling demands. This has the effect of increasing machine efficiency and fuel economy, as the engine does not have to drive the cooling fan load under all conditions. While the overall machine efficiency has increased, these machines having hydraulically driven demand fans have lost the retarding effect that the belt-driven fan had on the engine and machine during overspeed conditions.

The present disclosure is directed to overcoming one or more of the problems as set forth above.

SUMMARY

In one aspect of the present disclosure, a method for retarding an engine of a machine is provided. The machine has a hydraulic pump driven by the engine, a motor driven by the hydraulic pump, and a fan driven by the motor. The method includes sensing the operating speed of the engine with an engine speed sensor. The method also includes operating the motor at a first pressure. The method also includes comparing the operating speed to a trigger speed. The method also includes operating the motor at a second pressure greater than the first pressure if the operating speed of engine exceeds the trigger speed by a predetermined value.

In another aspect of the present disclosure, an apparatus for retarding an engine of a machine is provided. The machine has a hydraulic pump driven by the engine, a motor driven by the hydraulic pump, and a fan driven by the motor and comprises a means for sensing the operating speed of the engine, a means for operating the motor at a first pressure, a means for comparing the operating speed to a trigger speed, and a means for operating the motor at a second pressure greater than the first pressure if the operating speed of engine exceeds the trigger speed by a predetermined value.

In a third aspect of the present disclosure, a machine comprises an engine, a hydraulic pump driven by the engine, a motor driven by the hydraulic pump, a fan driven by the motor, an engine sensor operable to measure the operating speed of the engine, and a controller. The controller is in electrical communication with the engine sensor and the motor, and configured to operate the motor at a predetermined pressure if the operating speed exceeds a trigger speed by a predetermined value.

DETAILED DESCRIPTION

Figure 1:
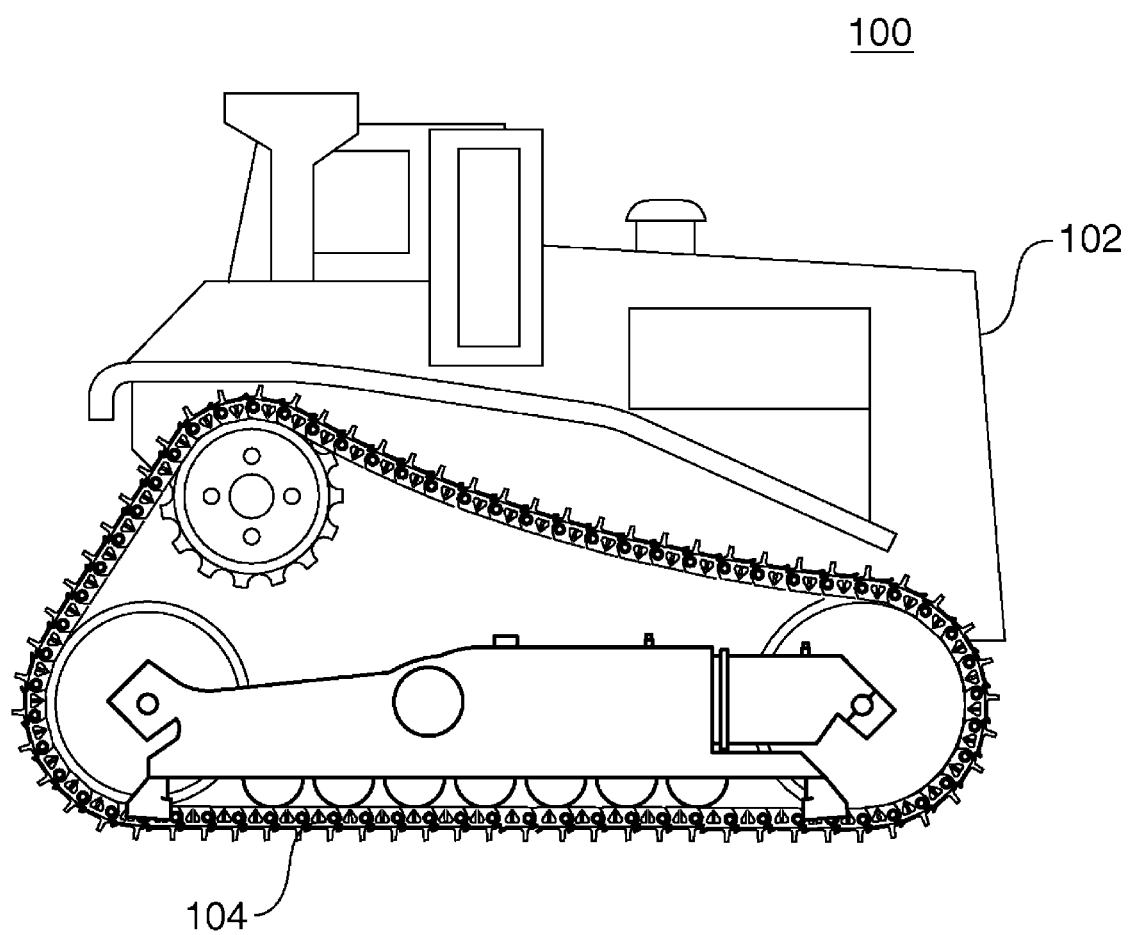
FIG. 1 is a diagrammatic illustration of a machine suitable for use with the present disclosure.

Referring to the drawings, a method and apparatus 100 for retarding an engine of a machine 102 is shown.

For example, as exemplified in FIG. 1, the machine 102 is depicted as a track-type tractor having left and right tracks 104, suitable for use in a number of earth working operations, such as mining, construction, and the like. However, other types of machines could also be used with the present disclosure, such as, but not limited to, skid-steer loaders, tracked loaders, excavators, agricultural machines, and off-highway vehicles.

Figure 2:
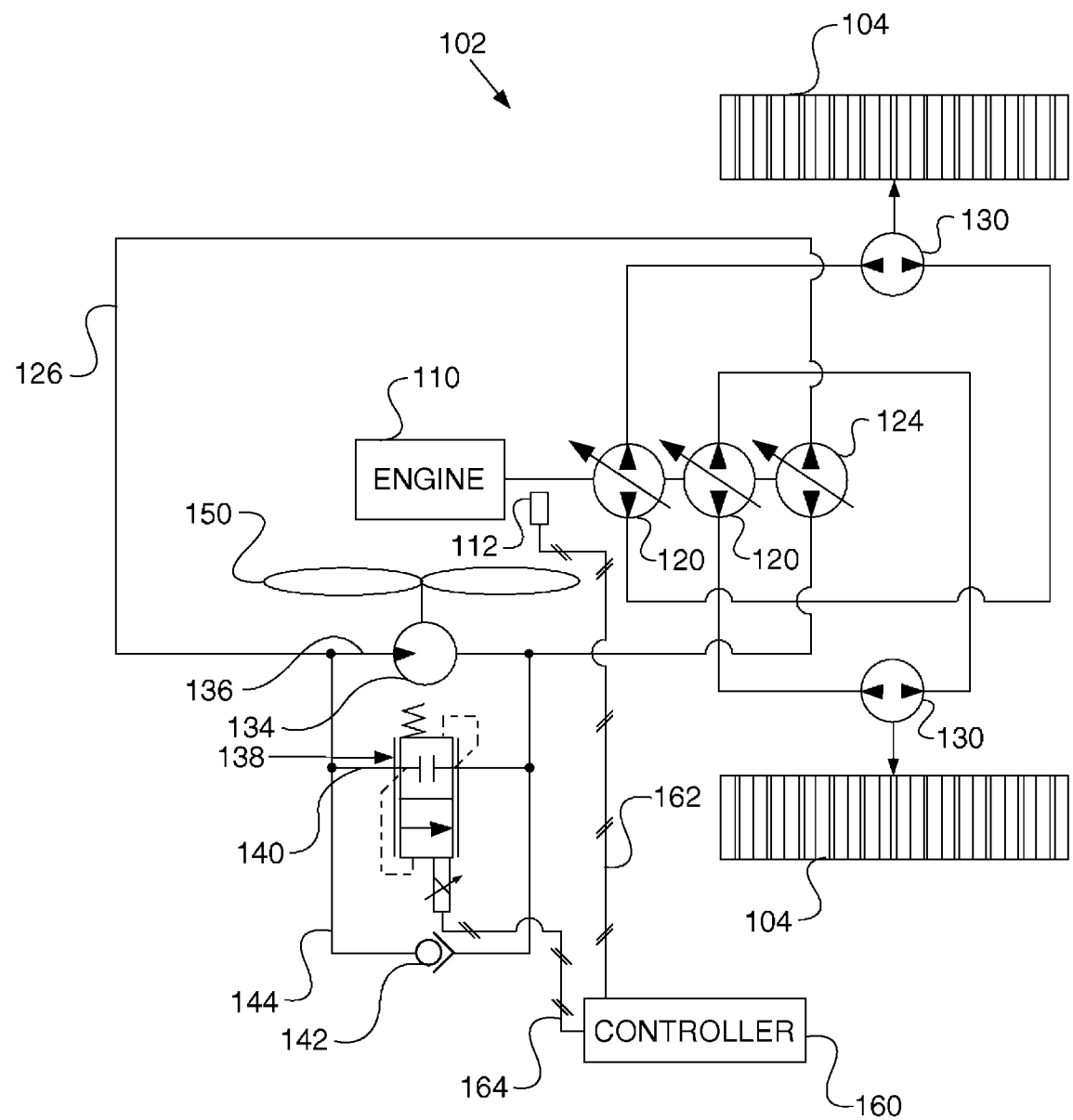
FIG. 2 is a block diagram illustrating an exemplary fluid control system for use with the present disclosure.

A fluid control system for the machine 102 is shown in FIG. 2. In this example, an engine 110 provides power to the tracks 104 and a fan 150. A controller 160 senses the operating speed of the engine 110 through an engine speed sensor 112, and controls the fan speed through a control valve 138. The distribution of power is controlled by a plurality of pumps 120, 124 and motors 130, 134. More specifically, a left pump 120, such as a hydraulic pump, drives a left motor 130, which in turn propels the left track 104. Similarly, a right pump 120 drives a right motor 130, which in turn propels the right track 104. Alternately, a single pump may be used to drive both the left motor and the right motor. The pumps 120 may be configured to produce a variable output of pressurized fluid and may include a swash plate pump and/or any type of variable displacement pump.

The speed of rotation of the left and right motors 130 determines the speed of the respective left and right tracks 104. This type of drive transmission is known in the art as a dual-path hydrostatic transmission, although other drive configurations may be used as well. For example, other types of transmissions for machines include, but are not limited to, a mechanical transmission having a clutch and gear system (not shown), an electrical variable-speed transmission (not shown), a hydro-mechanical transmission, e.g., a split-torque transmission (not shown), and a hydrokinetic transmission having a torque converter system (not shown). These alternate transmission types are all well known in the art and are not discussed further. In addition, it is contemplated wheels may be substituted for the tracks 104.

The engine 110 may be any power source such as, for example, a diesel engine, a gasoline engine, a gaseous fuel driven engine, or any other engine known in the art. It is contemplated that the engine 110 may alternately include another source of power such as a fuel cell, a power storage device, an electric or hydraulic motor, and/or another source of power known in the art. The engine speed sensor 112 is adapted to sense the output speed of the engine 110 and direct an engine speed signal representative of the rotational speed of the engine 110 to the controller 160 over a communication line 162.

The controller 160, which may be integral with an engine controller (not shown) in communication with the engine 110, may be an electronic control module and may also include one or more microprocessors, a memory, a data storage device, a communications hub, and/or other components known in the art. It is contemplated that the controller 160 may be further configured to receive additional inputs (not shown) indicative of various operating parameters of the machine 102 and or additional components, such as, for example, temperature sensors, positions sensors, and/or any other parameter known in the art. It is also contemplated that the controller 160 may be preprogrammed with parameters and/or constants indicative of and/or relating to the machine 102. It is also contemplated that the controller 160 may receive and deliver signals via one or more communication lines (not shown) as is conventional in the art. It is further contemplated that the received and delivered signals may be any known signal format, such as, for example, a current or a voltage level.

As mentioned above, the engine 110 drives a fan charge pump 124. The fan charge pump 124 may be configured to produce a variable output of pressurized fluid and may include a swash plate pump and/or any type of variable displacement pump. The pump 124 supplies hydraulic fluid through a first hydraulic conduit 126 to the fan motor 134 through a second hydraulic conduit 136 and to a control valve 138 through a third hydraulic conduit 140. A fourth hydraulic conduit 144 is coupled between the first, second, and third hydraulic conduits 126, 136, 140 and a check valve 142. When the pressure downstream of the check valve 142 exceeds the upstream pressure, the check valve 142 allows hydraulic fluid to flow from a position downstream of the fan motor 134 and the control valve 138 through the check valve 142 and into the second and third hydraulic conduits 136, 140.

The control valve 138 is a two-position solenoid valve that is spring biased to the first position. In the first position of the control valve 138, the flow through the third hydraulic conduit 140 is blocked. The control valve 138 is movable to the second position in response to receipt of an electrical signal from the controller 160 through a second communication line 164. In the second position, the control valve 138 allows flow through the third conduit 140, allowing hydraulic fluid flow to bypass the fan motor 134 and the second hydraulic conduit 136. It is recognized that the control valve 138 variably controls fluid flow through the third hydraulic conduit 140 depending on its position between the fully closed, first position and the fully open, second position. In addition, pilot pressure from the third hydraulic conduit 140 further biases the control valve 138 from the fully closed, first position and the fully open, second position. Similarly, pilot pressure downstream of the control valve 138 biases the control valve 138 from the fully open, second position to the fully closed, first position.

Figure 3:
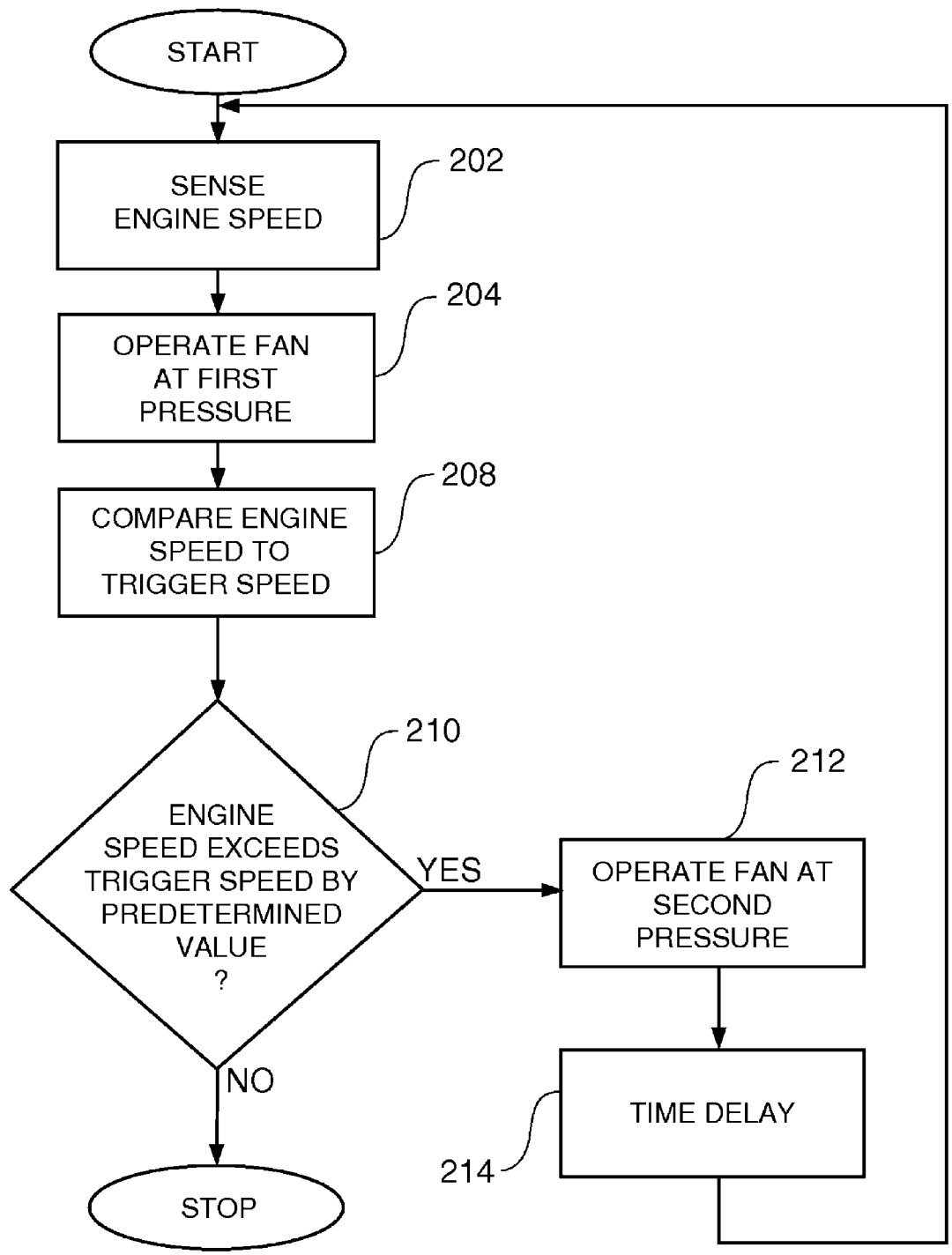
FIG. 3 is a block diagram illustrating an exemplary method for retarding the engine of the machine by operating the fan.

FIG. 3 is a flow diagram illustrating a method for retarding the engine of the machine by operating the fan and is discussed below.

In a first control block 202, the controller 160 senses the engine speed. The engine speed sensor 112 may sense the output speed of the engine 110 and direct a signal representative of the rotational speed of the engine 110 to the controller 160 over the communication line 162. This output speed may be measured at an output shaft (not shown) of the engine 110, at an input shaft to the pumps 120, or through any other technique known in the art.

In a second control block 204, the fan motor 134 is operated at a first pressure. The first pressure may be calculated as a function of the sensed engine speed or engine temperature, found through a look-up table or map that is based on various machine parameters, or through any other technique known in the art. The controller 160 controls the fan 150 by varying the force applied to the control valve 138, thus increasing or decreasing the pressure to the fan motor 134. If the force is zero, the spring on the control valve 138 biases the valve to minimum bypass, allowing maximum flow to flow through the fan motor 134. If the force is at a maximum, the control valve 138 is shifted to the second position. In the second position, the control valve 138 allows flow through the third conduit 140, allowing hydraulic fluid flow to bypass the fan motor 134 and the second hydraulic conduit 136.

In a third control block 208, the sensed speed of the engine 110 is compared to a trigger speed. In a fourth decision block 210, it is determined if the sensed engine speed exceeds the trigger speed by a predetermined value. In one embodiment, the predetermined value may be 200 rpm. However, this predetermined value may be made application and machine specific. If the answer to the decision block 210 is yes, in a fifth control block 212, the fan motor 134 is operated at a second pressure, where the second pressure exceeds the first pressure. The second pressure may be set to a maximum fan motor pressure, a percentage increase of the first pressure, some multiple of the first pressure, or through any other technique known in the art. The controller 160 may increase the pressure of the fan motor 134 by decreasing the force applied to the control valve 138, shifting the control valve towards the first position and reducing the hydraulic fluid flow that is allowed to bypass the fan motor 134 and the second hydraulic conduit 136.

In a sixth control block 214, the controller 160 waits for a predetermined time delay, and then returns to control block 202, where the operating speed of the engine 110 is sensed. However, if the answer to the decision block 210 is no, the controller 160 continues to operate the fan motor 134 at the first pressure.

In a step not shown in FIG. 3, the controller 160 may also derate the engine 110, such that less power is available when the fan motor 134 is not operating at its maximum pressure. This derate may be based on a map of engine speed and a percentage of the fan motor 134 operating pressure such that a constant net power is available from the engine to the other systems of the machine 102. In addition, the fan motor 134 may be sized such that the maximum first pressure in control block 204 is some percentage of the maximum fan motor pressure, such as 70 percent. Moreover, the predetermined value used in decision block 210 may be adjusted depending on whether the fan motor 134 is operating at the first pressure or the second increased pressure. For example, the predetermined value may be 50 rpm if the fan motor 134 is operating at the second pressure, compared with 200 rpm if the fan motor 134 is operating at the first pressure. However, this predetermined value may be made application and machine specific.

It is noted that, in one embodiment, the controller 160 includes the means for sensing an engine speed and a means for comparing the sensed engine speed to the trigger speed. The engine speed sensor 112 includes a means for sensing the operating speed of the engine, while the fan charge pump 124, fan motor 134, control valve 138, and controller 160 include a means for operating the fan 150 at a first pressure and a means for operating the fan 150 at a second pressure greater than the first pressure if the operating speed of engine 110 exceeds the desired engine speed by a predetermined value.

INDUSTRIAL APPLICABILITY

As an example of an application of the present disclosure, an operator may operate the engine 110 of the machine 102 at an operating speed. The controller 160 operates the fan motor 134 at a first pressure corresponding to the sensed engine speed. However, when traveling rapidly downhill, the machine 102 may be placed in an overspeed condition. In such an overspeed condition, the engine 110 will be driven to a speed greater than the desired operating speed. Without providing an additional power sink, it may not be possible to indefinitely maintain the engine speed and the motor speed below dangerous levels on slopes within the functional requirements of the machine. In the present disclosure, when the controller 160 detects this overspeed condition, the controller 160 commands the fan motor 134 to operate at a second pressure. By driving the fan motor 134 to operate at or near a maximum fan motor pressure, the fan 150 may provide a considerable power sink, absorbing roughly as much power as the engine 110 through the parasitic loss.

While the disclosure has been described with reference to details of the illustrated embodiments, these details are not intended to limit the scope of the disclosure as defined in the appended claims. For example, the controller may use a machine orientation sensor such as an inclinometer, a global positioning system sensor, or some other sensor known in the art to detect the orientation of the machine. The controller may then command the fan to provide increased resistance when the machine orientation exceeds certain predefined limits. Moreover, when the machine detects an engine overspeed condition, the controller may use other engine retarding methods in addition to commanding the fan to provide increased resistance. For example, the controller may operate the hydrostatic pump and motor in an inefficient range by destroking the pump and motor by an equal percentage. This reduces machine efficiency while leaving the speed ratio unchanged. In addition, the present disclosure may be applied to clutch driven fans. During overspeed conditions, the algorithm would make sure the fan is fully engaged via the clutch. If a variable displacement pump is used for the fan charge pump 134, the controller 160 may also increase or decrease the swash plate angle, thereby increasing or decreasing the pressure in the first hydraulic circuit 126 and the fan motor 134, thus altering the parasitic load caused by the fan 150.

Other aspects, objects, and features of the present invention can be obtained from a study of the drawings, the disclosure, and the appended claims.

What is claimed is:

1. A method for retarding an engine of a machine, the machine having a hydraulic pump driven by the engine, a motor driven by the hydraulic pump, and a fan driven by the motor, including the steps of:
    sensing the operating speed of the engine with an engine speed sensor;
    operating the motor at a first pressure;
    comparing the operating speed to a trigger speed; and
    operating the motor at a second pressure greater than the first pressure if the operating speed of the engine exceeds the trigger speed by a predetermined value.

2. The method of claim 1, wherein the fan is a hydraulically driven demand fan.

3. The method of claim 1, wherein the second pressure is approximately a maximum pressure of the motor.

4. The method of claim 1, wherein the machine includes a controller in electrical communication with the engine speed sensor, and a solenoid valve hydraulically coupled to the pump and the motor and in electrical communication with the controller.

5. The method of claim 4, wherein the step of operating the motor at a second pressure includes changing a force supplied to the solenoid valve.

6. The method of claim 1, further including the step of:
    derating the engine when the operating speed of the engine is less than the trigger speed by the predetermined value.

7. The method of claim 1, wherein the predetermined value is approximately 200 revolutions per minute.

8. An apparatus for retarding an engine of a machine, the machine having a hydraulic pump driven by the engine, a motor driven by the hydraulic pump, and a fan driven by the motor, comprising:
    means for sensing the operating speed of the engine;
    means for operating the motor at a first pressure;
    means for comparing the operating speed to a trigger speed; and
    means for operating the motor at a second pressure greater than the first pressure if the operating speed of engine exceeds the trigger speed by a predetermined value.

9. The apparatus of claim 8, wherein the fan is a hydraulically driven demand fan.

10. The apparatus of claim 9, wherein the second pressure is approximately a maximum pressure of the motor.

11. The apparatus of claim 9, wherein the machine includes a controller in electrical communication with the means for sensing the operating speed of the engine, and a solenoid valve hydraulically coupled to the pump and the motor and in electrical communication with the controller.

12. The apparatus of claim 11, wherein the means for of operating the motor at a second pressure includes means for changing a force supplied to the solenoid valve.

13. The apparatus of claim 9, further including the step of:
    means for derating the engine when the operating speed of the engine is less than the trigger speed by the predetermined value.

14. The apparatus of claim 9, wherein the predetermined value is approximately 200 revolutions per minute.

15. A machine comprising:
    an engine;
    a hydraulic pump driven by the engine;
    a motor driven by the hydraulic pump;
    a fan driven by the motor;
    an engine sensor operable to measure the operating speed of the engine; and
    a controller in electrical communication with the engine sensor and the motor, and configured to operate the motor at a predetermined pressure if the operating speed of the engine exceeds a trigger speed by a predetermined value.

16. The machine of claim 15, wherein the fan is a hydraulically driven demand fan.

17. The machine of claim 15, wherein the predetermined pressure is approximately a maximum pressure of the motor.

18. The machine of claim 15, further comprising:
    a solenoid valve hydraulically coupled to the pump and the motor and in electrical communication with the controller.

19. The machine of claim 15, wherein the controller is operable to derate the engine when the operating speed of the engine is less than the predetermined value.

20. The machine of claim 15, wherein the predetermined value is approximately 200 revolutions per minute.

* * * * *